US008677340B2

(12) United States Patent
Dube et al.

(10) Patent No.: US 8,677,340 B2
(45) Date of Patent: Mar. 18, 2014

(54) PLANNING AND OPTIMIZING IT TRANSFORMATIONS

(75) Inventors: Jean M. Dube, Marlboro, NJ (US); James J. Gallombardo, Bridgewater, NJ (US); Praduemn K. Goyal, Holmdel, NJ (US); James V. Sbordon, Bridgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/652,306

(22) Filed: Jan. 5, 2010

(65) Prior Publication Data

US 2011/0166849 A1 Jul. 7, 2011

(51) Int. Cl.
*G06F 9/44* (2006.01)

(52) U.S. Cl.
USPC .......................................................... 717/168

(58) Field of Classification Search
None
See application file for complete search history.

(56) References Cited

U.S. PATENT DOCUMENTS

| | | | | |
|---|---|---|---|---|
| 4,887,206 A | * | 12/1989 | Natarajan | 705/29 |
| 5,233,513 A | * | 8/1993 | Doyle | 705/7.11 |
| 5,737,227 A | * | 4/1998 | Greenfield et al. | 705/400 |
| 5,745,880 A | * | 4/1998 | Strothmann | 705/7.37 |
| 5,793,632 A | * | 8/1998 | Fad et al. | 705/400 |
| 6,004,015 A | * | 12/1999 | Watanabe et al. | 700/28 |
| 6,219,654 B1 | * | 4/2001 | Ruffin | 705/400 |
| 6,260,020 B1 | * | 7/2001 | Ruffin et al. | 705/7.25 |
| 6,311,175 B1 | * | 10/2001 | Adriaans et al. | 706/25 |
| 6,526,387 B1 | | 2/2003 | Ruffin et al. | |
| 6,557,008 B1 | * | 4/2003 | Temple et al. | 1/1 |
| 6,560,569 B1 | | 5/2003 | Abu El Ata | |
| 6,675,149 B1 | * | 1/2004 | Ruffin et al. | 705/7.12 |
| 6,968,324 B1 | * | 11/2005 | Ruffin et al. | 705/400 |
| 7,350,185 B2 | * | 3/2008 | Sparago et al. | 717/101 |
| 7,472,037 B2 | * | 12/2008 | Brown et al. | 702/182 |
| 7,616,583 B1 | * | 11/2009 | Power et al. | 370/252 |
| 7,716,661 B2 | * | 5/2010 | Paul et al. | 717/173 |
| 7,752,144 B1 | * | 7/2010 | Myers et al. | 705/400 |
| 8,234,156 B2 | * | 7/2012 | Comas et al. | 705/7.37 |
| 8,290,806 B2 | * | 10/2012 | Lee et al. | 705/7.23 |
| 8,296,615 B2 | * | 10/2012 | Rajamony et al. | 714/745 |
| 8,402,452 B2 | * | 3/2013 | Baratti et al. | 717/169 |
| 2003/0018573 A1 | * | 1/2003 | Comas et al. | 705/38 |
| 2004/0172612 A1 | * | 9/2004 | Kasravi et al. | 717/101 |
| 2005/0114829 A1 | * | 5/2005 | Robin et al. | 717/101 |
| 2005/0131754 A1 | | 6/2005 | Chapman et al. | |
| 2006/0230395 A1 | * | 10/2006 | Paul et al. | 717/173 |
| 2008/0256516 A1 | * | 10/2008 | Chaar et al. | 717/121 |
| 2008/0281652 A1 | | 11/2008 | Iqbal et al. | |

(Continued)

*Primary Examiner* — Neveen Abel Jalil
*Assistant Examiner* — Tyler Torgrimson
(74) *Attorney, Agent, or Firm* — John R. Pivnichny; Law Office of Jim Boice

(57) ABSTRACT

A computer-implemented method, system, and computer program product for planning and optimizing information technology (IT) infrastructure transformations is presented. A predictive effort estimation model for transforming an existing IT infrastructure into a transformed IT infrastructure is initially created. The introduction of a new application into the existing IT infrastructure through a use of a decision tree as a transformation path determination is emulated to create a transformation path emulation. The use of a software factory is emulated for introducing the new application into the existing IT infrastructure to create a software factory use emulation for creating the transformed IT infrastructure. The predictive effort estimation model is accurized using results from the transformation path emulation and the software factory use emulation to create an accurized transformed IT infrastructure model. A physical transformed IT infrastructure is then deployed using the accurized transformed IT infrastructure model.

12 Claims, 7 Drawing Sheets

(56) References Cited

U.S. PATENT DOCUMENTS

| | | |
|---|---|---|
| 2008/0301076 A1 | 12/2008 | Timmins et al. |
| 2008/0312979 A1 | 12/2008 | Lee et al. |
| 2008/0313008 A1* | 12/2008 | Lee et al. ................. 705/10 |
| 2008/0313110 A1* | 12/2008 | Kreamer et al. ............. 706/12 |
| 2008/0313595 A1* | 12/2008 | Boulineau et al. ........... 717/101 |
| 2009/0249284 A1* | 10/2009 | Antosz et al. ............... 717/104 |
| 2010/0223211 A1* | 9/2010 | Johnson et al. .............. 706/11 |

* cited by examiner

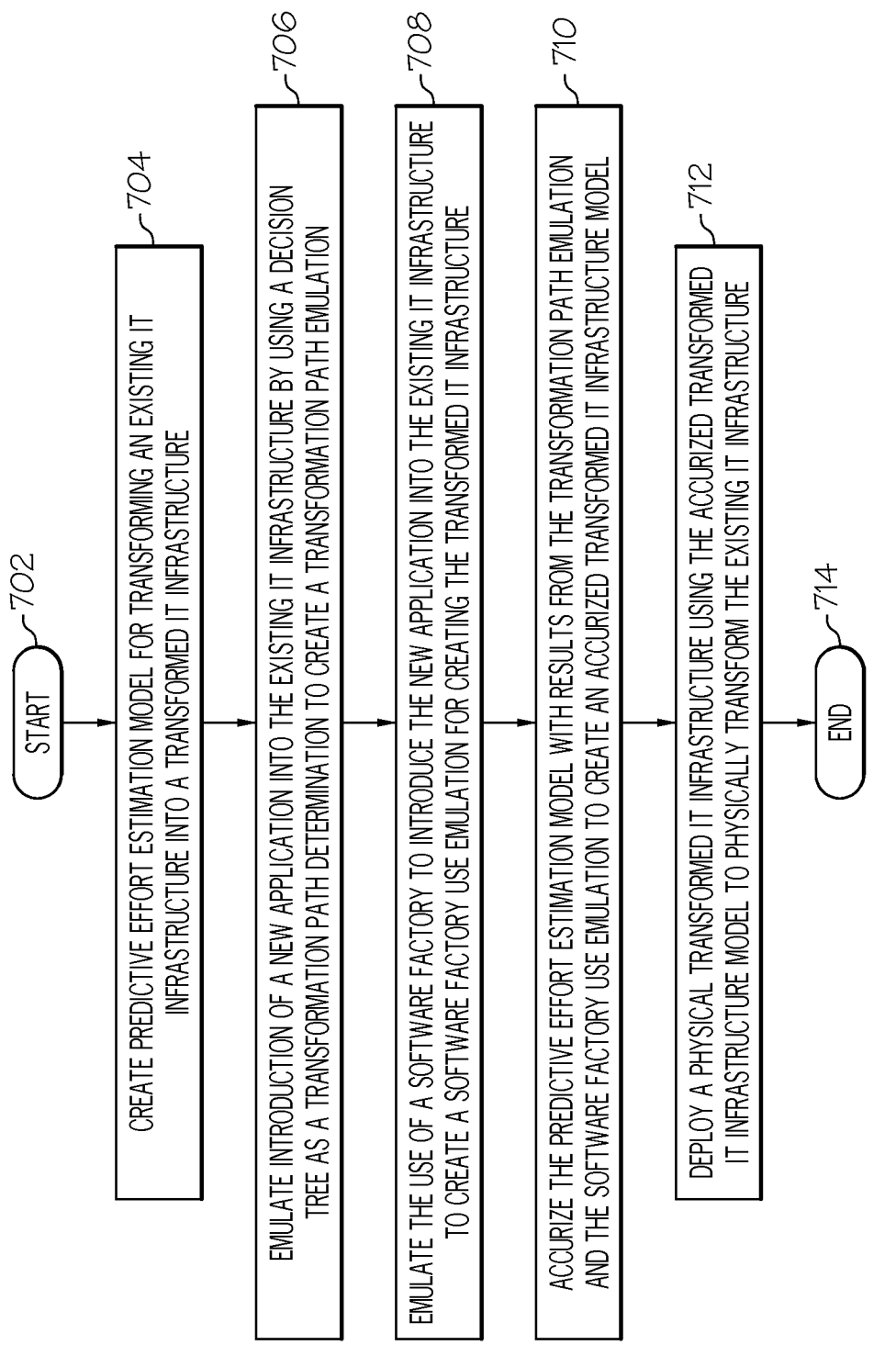

PLANNING AND OPTIMIZING IT TRANSFORMATIONS

BACKGROUND

The present disclosure relates to the field of computers, and specifically to information technology (IT) systems. Still more particularly, the present disclosure relates to IT system transformations.

BRIEF SUMMARY

A computer-implemented method, system, and computer program product for planning and optimizing information technology (IT) infrastructure transformations is presented. A predictive effort estimation model for transforming an existing IT infrastructure into a transformed IT infrastructure is initially created. The introduction of a new application into the existing IT infrastructure through a use of a decision tree as a transformation path determination is emulated to create a transformation path emulation. The use of a software factory is emulated for introducing the new application into the existing IT infrastructure to create a software factory use emulation for creating the transformed IT infrastructure. The predictive effort estimation model is accurized using results from the transformation path emulation and the software factory use emulation to create an accurized transformed IT infrastructure model. A physical transformed IT infrastructure is then deployed using the accurized transformed IT infrastructure model.

BRIEF DESCRIPTION OF THE SEVERAL VIEWS OF THE DRAWINGS

FIG. 7 is a high-level flow-chart of exemplary steps processed by a computer to transform a legacy IT system.

DETAILED DESCRIPTION

Figure 1:
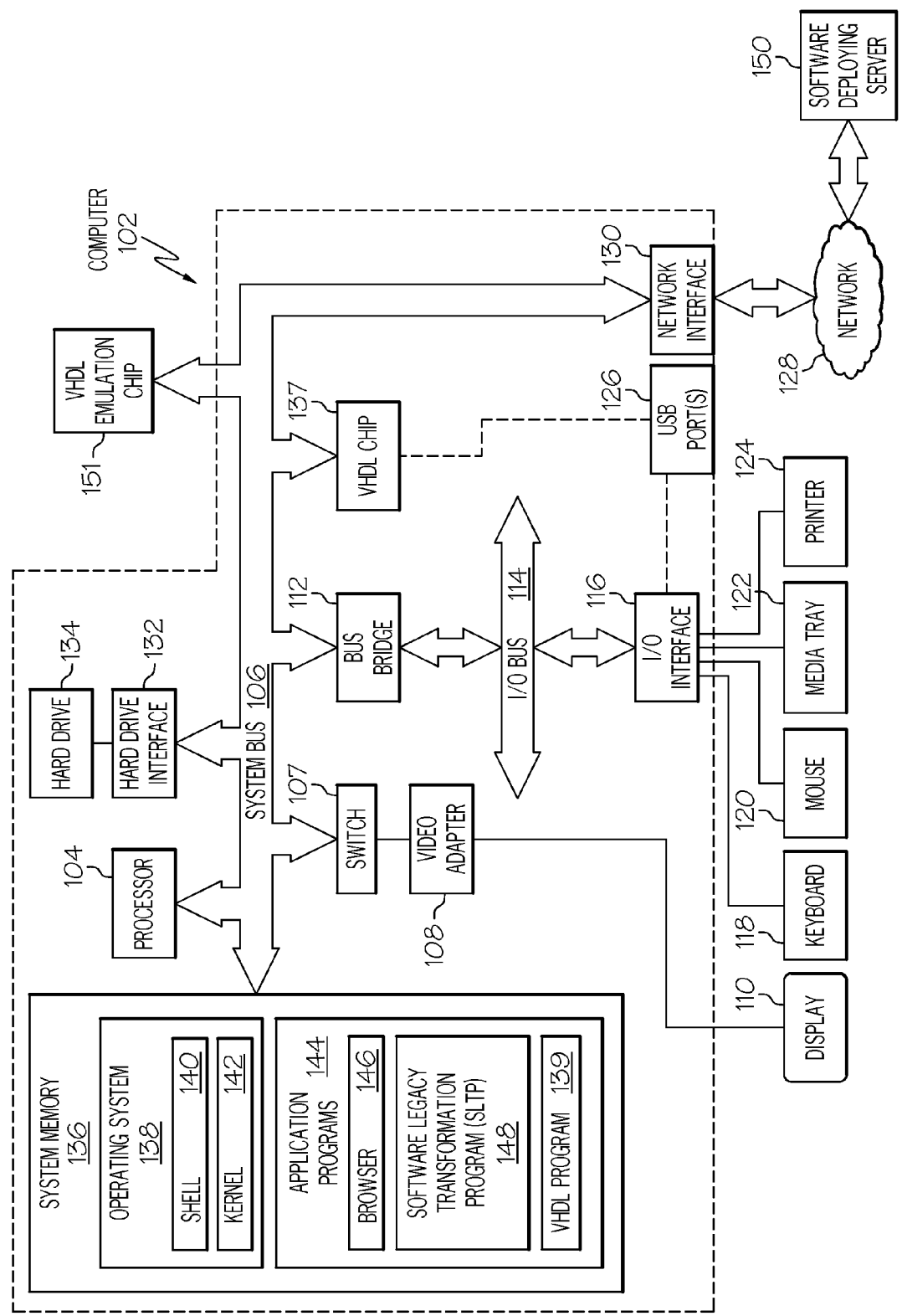
FIG. 1 depicts an exemplary computer in which the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., software legacy transformation program—SLTP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory and profile webpage server 604's system memory) also include software legacy transformation program (SLTP) 148. SLTP 148 includes code for implementing the processes described below, including those described in FIGS. 2-7. In one embodiment, computer 102 is able to download SLTP 148 from software deploying server 150, including in an on-demand basis. Note further that, in one embodiment of the present invention, software deploying server 150 performs all of the functions associated with the present invention (including execution of SLTP 148), thus freeing computer 102 from having to use its own internal computing resources to execute SLTP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from SLTP 148 causes VHDL program 139 to configure VHDL chip 137, which may be an FPGA, ASIC, etc.

In another embodiment of the present invention, execution of instructions from SLTP 148 results in a utilization of VHDL program 139 to program a VHDL emulation chip 151. VHDL emulation chip 151 may incorporate a similar architecture as described above for VHDL chip 137. Once SLTP 148 and VHDL program 139 program VHDL emulation chip 151, VHDL emulation chip 151 performs, as hardware, some or all functions described by one or more executions of some or all of the instructions found in SLTP 148. That is, the VHDL emulation chip 151 is a hardware emulation of some or all of the software instructions found in SLTP 148. In one embodiment, VHDL emulation chip 151 is a programmable read only memory (PROM) that, once burned in accordance with instructions from SLTP 148 and VHDL program 139, is permanently transformed into a new circuitry that performs the functions needed to perform the process described below in FIGS. 2-7.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

The present disclosure addresses large-scale legacy IT infrastructure transformation programs (thousands of servers and hundreds of applications), which are highly complex. The transformation of a legacy software application into a new software application requires a consideration of a diverse set of hardware, operating system and commercial off-the-shelf (COTS) software components in a multi-vendor, multi-version environment. Problem complexity is further increased due to business and technical rules and constraints that are imposed by the customer environment and the risk tolerance of the customer.

Achieving a cost and risk optimal transformation in such an environment requires assessment of a large number of decision variables and transformation parameters and evaluation of multiple transformation paths to determine the optimal transformation and the best path to achieve it. Proposal preparation and budgeting of such programs using bottom-up cost estimate methods is also impractical due to the sheer size. Thus, presented herein is a model enabled based factory approach to legacy transformation that leverages the synergies across transformation nodes to reduce transformation costs and risks. In one embodiment, this approach utilizes a decision support model that utilizes evaluation and estimation tools to realize a cost and risk optimal transformation. This decision support model may utilize both a platform refresh option as well as a lift-and-load binary transformation option. In one embodiment, a quantitative scoring criterion is used for evaluating various transformation paths on a number of business, technical and application decision factors. In one embodiment, a predictive cost model estimates transformation costs on various transformation paths. The predictive cost model uses a parametric model having source and target environment attributes as variables. The parametric model is built using statistical multivariate regression analysis from a sample of ground-up transformation cost estimates.

Legacy infrastructures in existence at large enterprises are typically comprised of thousands of servers and hundreds of applications which have been amassed over decades as a result of growth in business unit silos as well as a multitude of mergers and acquisitions. Lack of enterprise standards and governance results in unstructured growth and juxtaposition of disparate infrastructures from mergers and acquisitions. Such an environment presents multiplicity of hardware, operating system, commercial off-the-shelf software as well as home grown infrastructure and application components. The variability and multiplicity of vendors and versions that exists in this legacy brings unique constraints and conflicting requirements. These factors make consolidation and transformation a hard problem from both technology and cost perspectives. Finding an optimal transformation strategy and solution requires evaluation of multiple targets and transformation paths over a multitude of parameters.

The legacy environment is often largely in maintenance mode with little or no new development beyond critical production fixes. At times, no documentation is available on the legacy applications and whatever little may exist has not been maintained over the years and no longer reflects the current state of the legacy environment. There are often out-of-support and one-off components for which vendor support is non-existent. In the past, such environments have had a high degree of reliance on subject matter experts. However, due to attrition and deep cost cutting on maintenance mode applications over the years, it is frequently found that needed subject matter expertise is non-existent.

Current business environments are highly competitive and there is increasing pressure to lower costs. Even though a business has a mission critical dependence on its legacy environment, cost pressures and lack of funding for infrastructure maintenance limit platform refresh and render hardware and software components to out-of-maintenance and end-of-life state. Often a catastrophic production failure provides the impetus to get minimal maintenance funding. Business demand for greater integration across business unit silos and infrastructure brought in through mergers and acquisitions without architecture rationalization and consolidations creates a high degree of interdependence between infrastructure components.

While the traditional approaches for legacy transformation based on direct source-to-target mapping and bottom-up cost estimation may work well for smaller transformation projects, they do not scale as the size of a transformation program increases. The traditional approaches may pass over optimization opportunities in planning and execution, failing to fully realize various economies that present themselves on large scale transformation programs.

Planning and implementing large scale legacy transformation programs requires a data-driven, model enabled factory based approach that optimizes the transformation cost and risk by systematically evaluating transformation paths and by taking advantage of various economies of scale. Effort estimation models are used to calculate predicted transformation costs for budgeting and client proposals.

There are three major tenets of the large scale legacy transformation approach currently proposed: 1) decision support models for optimizing transformation path planning; 2) factory based implementation to leverage economies of scale; and 3) predictive effort estimation models to price transformation program costs.

Decision Support Models

Multiple mappings are possible from source environment to target environment in realizing large scale legacy transformation. Multiple source nodes may be consolidated into a virtualized target environment. Migration to a different hardware and OS environment or moving to a different third party COTS component from the legacy one may be involved. Alternatively, one may stay with the same hardware and OS and use the same COTS components (like-for-like). There may be variations between the two extremes wherein one or more of the hardware, OS, or COTS may change while others remain the same in various combinations and versions. There are also multiple transformation paths to be considered. One can "lift and load" binaries or "refresh and rebuild" when migrating from source to target environment.

Transformation planning requires determining the best transformation mapping from source to target and identifying the best transformation path to realize the transformation. Determining a most optimal transformation requires consideration of business and technical constraints as well as multiple transformation target options. This requires consideration of a large number of decision variables and evaluation of multiple transformation paths.

Presented herein is a decision tree approach that systematically guides the decision making process. The decision tree considers various target transformations, using decision nodes that utilize quantitative scoring based on application surveys to determine the most optimal transformation path under the constraints.

Factory Based Implementation

Large scale transformation programs present opportunities for realizing various economies of scale that can be maximized using a factory approach and by organizing and scheduling work through the factory in an optimal manner.

Economies of scale are realized when same or similar source to target transformations are being repeatedly performed. The knowledge and experience gained from the first set of transformations are captured in a knowledge base, along with tools and personnel experience, and are retained in the factory. They are reused and applied for subsequent transformations requiring the same or similar source to target transformation.

Economies of organization are realized by organizing the factory around Centers of Excellence (COE) by target. A Center of Excellence consists of an amalgamation of experts in a particular area. This allows for critical expertise to be developed, enhanced and retained in focused organizational units. Economies of integration are realized by identifying clusters of dependent applications that are being transformed and organizing this dependent application set in the same transformation bundle. Such clustering allows for integration testing in a target environment to be performed once when members of the cluster are transformed together instead of repeating the same integration points multiple times as various members of the cluster get transformed at different times.

Predictive Effort Estimation Models

While the technical complexity of planning and implementing large scale transformation is challenging and requires comprehensive decision support and factory models, the business aspects of cost estimation and proposal are no less complex and require similar treatment. When dealing with thousands of servers and hundreds of applications, traditional cost estimation approaches based on direct effort based cost is impractical.

Presently proposed is a model based approach to building cost estimations that use source and target application characteristics to provide an estimate of the transformation cost. This model based approach uses a small representative set from the set of applications being transformed to build an initial cost model. The model is then applied to provide cost estimates for the rest of the applications for budgeting and building transformation proposals. As the transformation planning and implementation progresses, the model is continuously recalibrated and refined using the more accurate data from actual effort spent and additional bottom-up estimates. Estimates for the remaining applications are then updated using the refined model.

While one of the major goals of the legacy transformation is to realize cost savings through virtualization and uniformity in operating environment, it would be cost prohibitive to implement a completely homogenous environment. Typically, the target environment will have a few virtualized environments with representation from the predominant operating system present in the legacy environment.

Transformation planning involves evaluating the available transformation paths to determine the best transformation option for the applications under consideration. There are multiple source-to-target transformation mappings that may be considered when planning a large-scale transformation program, since legacy source environments present a high degree of diversity in hardware, operating system (OS) and commercial off-the-shelf (COTS) components with various version and support levels. Different source-target mapping and transformation paths present varying degrees of risk and have different costs characteristics. An optimal transformation path would depend on the customer's risk tolerance, diversity of legacy environment and the target environment.

There are three main types of transformations: binary, like-for-like, and custom.

Binary Transformation

This transformation strategy is used for applications that are in maintenance mode and do not receive much enhancement activity. These applications are needed for running the current business but are not part of the strategic target architecture and are slated to be retired and replaced in near future. Due to maintenance mode operation and lack of new investment in these applications, there is usually a lack of application expertise and sometimes even missing source code. A main objective of binary transformation is to get these applications transformed to a target environment at the lowest possible cost and keep them running until they can be retired and replaced. While binary transformation provides easier and faster transformation path at a lower cost, it relies on binary compatibility mode operation on the new OS version. Thus, the larger the gap between the legacy OS version and the target OS version, the greater the risk of incompatibility. In a worst case scenario, issues with binary compatibility mode may force a like-for-like or custom transformation.

Binary transformation entails moving the applications' binary executable code from legacy hardware/OS to supported hardware/OS (e.g. the same vendor/manufacturer). The current application and COTS binary executable code is installed on newer, supported hardware with or without an OS upgrade (the latter is also referred to as an "Image Move"). There are two sub-paths within Binary Transformation:

Binary with OS upgrade—this option is feasible when the current legacy binary code is able to run on a new OS version, i.e., the OS and COTS vendors support "binary compatibility mode" operation.

Binary without OS upgrade—this option is used to move an existing binary code and OS to the new target hardware environment. It provides a low cost option to address hardware end-of-life issues in legacy environments or to realize server consolidation/virtualization without having to do a software refresh.

In addition, the following constraints must also be taken into account when considering the feasibility of binary transformation: the target hardware needs to remain on the same chip architecture/instruction set, OS gap between source (e.g. n−1, or n−2) and target (n) needs to be as low as possible (release versions need to be as close as possible), and vendor support for binary compatibility mode operation for COTS components should be ensured.

Like-for-Like Transformation

Like-for-like transformation entails recompiling the application and upgrade COTS components to currently supported versions in the new version of the same vendor OS. Like-for-like transformation provides a lower cost transformation option when a supported version of vendor OS is available in the target along with supported versions of COTS components. Like-for-like transformation is suggested for applications that are part of the strategic target architecture and candidates for new investment and enhancement activity. This transformation path refreshes the application and COTS components and provides an opportunity to address performance, availability, reliability, security and capacity issues with the application. Like-for-like transformation is the preferred transformation option for applications and should be considered for all applications that are strategic to the enterprise where it is important to maintain and restore maintainability and supportability for the applications. This option is less expensive compared to an OS move.

Custom Transformation

Custom transformation entails migrating applications from legacy OS and hardware to different vendor strategic OS and hardware targets. This option is frequently more expensive in comparison with binary and like-for-like transformation options discussed above. However, for applications with missing code and known problematic areas or applications with unsupported and challenging third party components (i.e., contain COTS that do not have an upgrade path to the target platform), this may be the only viable option. Custom transformation is the remaining transformation option when like-for-like or binary transformation options are not feasible. It is often the only viable option when there is no upgrade path for the current OS and COTS components to the target environment, or when there is a need to rewrite application code due to missing source code or problematic application areas requiring a code rewrite. This option will incur additional costs over the like-for-like transformation to address OS, COTS and language gaps as well as for restoring maintainability gaps created by missing code.

Table I below shows the three transformation options with the application characteristics that will suggest the option along with a comparison of pros and cons for each option.

parameters 204 from one or more software applications slated for transformation, and creates a transformation cost prediction model 206 from it. Transformation cost prediction model 206 is then used for generating cost estimates for remaining applications being transformed. As described below, the model accuracy of transformation cost prediction model 206 is continuously improved as additional actual performance data becomes available.

In one embodiment, transformation cost prediction model 206 is based on multivariate correlation analysis. An initial version of the transformation cost prediction model 206 is built based on an analysis of the small representative set of application parameters 204. The initial version of transformation cost prediction model 204 takes as input application characteristics specified by application parameters and produces a cost estimate for it. A multivariate regression analysis of the transformation cost prediction model 206 is performed using application parameters characterizing the application being transformed. This statistical analysis establishes the correlation and contribution of each of the input application parameters to the output bottom-up cost estimates. This relative contribution is quantified in terms of model coefficients. Where application parameters are not independent i.e. one

TABLE I

| | Application Characteristics | Pros | Cons |
|---|---|---|---|
| Binary | Low enhancement activity<br>Legacy/Retirement candidate<br>Not mission critical or target architecture<br>OS/COTS/Target HW compatibility | Lower cost<br>Addresses HW EOL issues<br>Easier and fastest OS upgrade path<br>Viable in spite of missing code | Risk incurring like-for-like cost on top of binary<br>COTS EOL issues not addressed<br>Limits ability to make functional changes to the application<br>Non Functional Requirement (NFR) gaps not addressed<br>Does not enhance application maintainability and supportability<br>Does not take full advantage OS performance improvements<br>Success of port unpredictable |
| Like-for-like | Target Architecture (Enterprise TA)<br>High enhancement activity<br>SW and COTS nearing or at EOL<br>Mission critical application<br>Architecture remediation is required | More predictable upgrade path and costs<br>Refreshes COTS and addresses EOL issues<br>Potential to address NFR Gap<br>Enhances application maintainability and supportability | Higher cost and longer cycle time |
| Custom | Increment to Like-for-Like characteristics:<br>Missing Code<br>Known problematic areas requiring code rewrite<br>No upgrade path for current COTS - requires a new COTS product | Enable future enhancements on the application<br>Restores application maintainability and supportability<br>Solve SW language issues | Additional remediation costs over the factory model to address code, language and COTS gaps<br>Higher cost longest cycle time |

Figure 2:
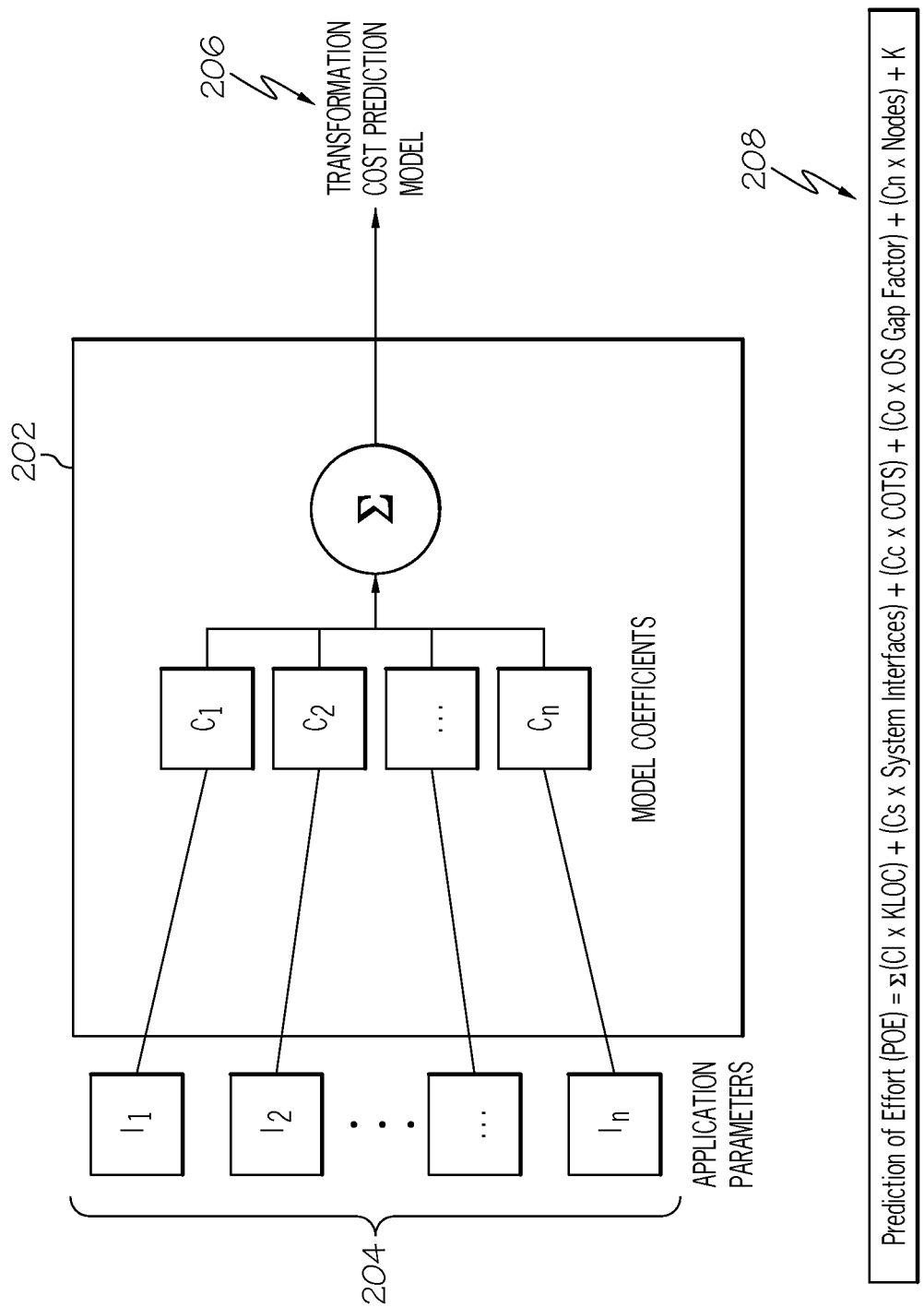
FIG. 2 illustrates an exemplary predictive effort estimation model describing a cost for transforming a legacy information technology (IT) system into a new IT system.

With reference now to FIG. 2, a high level overview of a predictive effort estimation model 202 as utilized in one embodiment of the present invention is presented. As described herein, predictive effort estimation model 202 uses estimation data from a representative set of application parameters 204 from one or more software applications slated application parameter is correlated with another, factor analysis can be used to cull the input parameter set. If the factor analysis is not performed up-front, the multivariate analysis will assign a large co-efficient to one of the co-dependent parameters and a low coefficient to the other. When there is a very high co-dependency, the model will assign it a small coefficient relative to other coefficients. In this case, the dependent parameter thus identified from the model is excluded and the analysis is rerun to re-estimate coefficients.

In one embodiment, the parameters utilized in the multivariate regression analysis are application size (kilo-lines of code—KLOC), number of system interfaces (between the legacy and/or replacement software and other software modules), number of commercial off the shelf (COTS) packages to be used in the transformation, operating system (OS) gap (level of difference, if any, between the legacy OS used and the OS to be used in the transformed system), and the number of nodes (e.g., object classes used by the legacy and the new software application). Each of these parameters is weighted with a "C" value, which represents the relative contribution of each of the application characteristics on the transformation effort. A summation of all of the weighted parameters, along with a normalizer "K" (representing an initially predicted fixed cost component of any similar software transformation process), result in a prediction of effort (POE) value used in creating the initial transformation cost predication model 204. As shown in formula 208 in FIG. 2, this results in the formula: Predication of Effort (POE)=Σ(Cl×KLOC)+(Cs× System Interfaces)+(Cc×COTS)+(Co×OS Gap Factor)+ (Cn×Nodes)+K.

Figure 3:
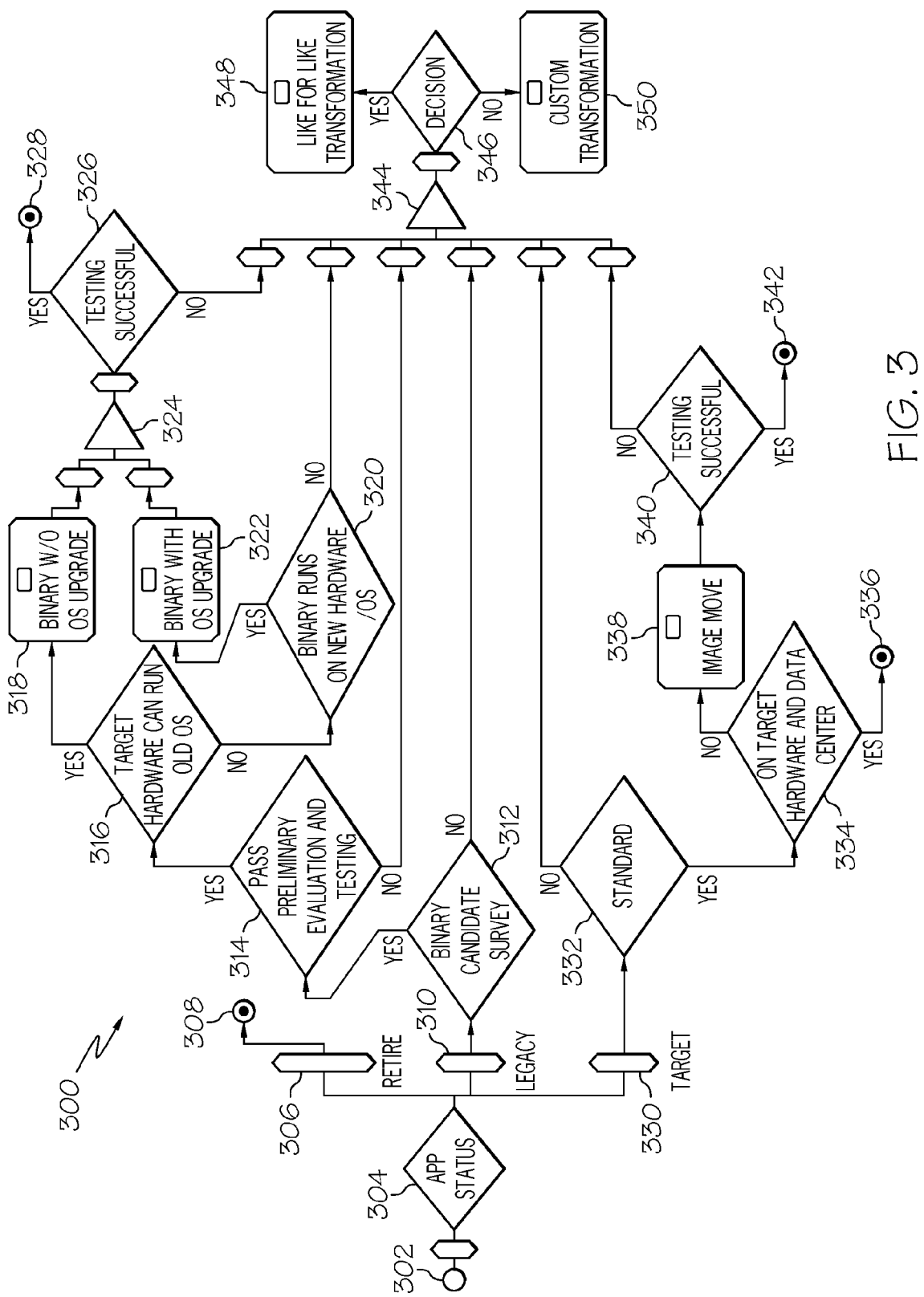
FIG. 3 depicts an exemplary decision tree that can be utilized to accurize a transformation cost prediction model.

With reference now to FIG. 3, a decision tree 300 can be utilized to accurize (i.e., to make more accurate) the transformation cost prediction model 204 shown in FIG. 2. In one embodiment, legacy transformation planning involves mapping legacy infrastructure components to target architecture and selecting the best transformation path to achieve the transformation. Large-scale legacy architecture presents a plethora of hardware, software, vendors and versions that all need to be mapped to target architecture. The problem complexity is further increased by technology, business and cost constraints placed on the transformation program by a customer. Decision tree 300 is a decision support tool that helps with determining the best transformation path by using a decision tree based approach, along with quantitative scoring and application surveys, to support the decision points in the decision tree.

Business and technical factors are used to decide an application's path to a target infrastructure. In one embodiment of the present disclosure, all the transformation paths utilize a factory approach consisting of defined and repeatable processes, tools, and experts, as described below. Determining a cost and risk optimal transformation under the customer constraints requires the evaluation of a large number of variables and multiple transformation paths. Decision tree 300, particularly when combined with scorecards and surveys, aids in this evaluation. Application surveys collect critical application data, which are scored and weighted to generate a quantitative score that is used to guide decision nodes in the decision tree 300. Decision tree 300 includes evaluation tasks and decision nodes to progressively evaluate and guide the transformation from source to target. Decision tree 300 incorporates various technical, business and risk parameters in the decision making process to find the best transformation path from a cost and risk perspective. Together, these tools capture the technical, business and application attributes that guide the user toward one of three transformation paths. For example, the following attributes can be considered when making a determination as to whether an application is a candidate for binary transformation:

Business Factors—Business factors measure business characteristics of the application. These characteristics provide information on past and future planned investment in the application, how critical the application is to the business, the impact to the business if the application is not available, and whether or not the application is part of the target enterprise architecture. Business factors may include Application Activity, Mission Criticality and Retirement Status when evaluating nodes in the decision tree 300.

Application Factors—application factors measure an application's dependence on other applications in the infrastructure and whether or not the application is meeting non-functional requirements (current and future performance and availability requirements). Application factors include Application Co-dependency and Non Functional Requirement Gap.

Mission Criticality—mission criticality defines how important the software being transformed from the legacy embodiment to the new embodiment is to an enterprise's operations.

Retirement Status—retirement status defines whether the candidate software for transformation is scheduled to be retired in the near future, or is intended to be used for some pre-defined extended period of time.

Technical Factors—technical factors seek to measure the gaps in technology and maintainability between source and target architectures in OS and COTS component dimensions. Technical factors include OS Gap, OS Vendor Support, COTS Gap and COTS Vendor Support.

The Decision Tree flowchart has a series of gates that guide the decision-making process for application transformation. It evaluates multiple transformation paths to determine optimal transformation and source to target mapping according to Like-for-like Transformation, Custom Transformation, and/or Binary Transformation (as defined above).

Decision tree 300 has a series of gates that guide the decision-making process for each application. After initiator block 302, a query is made as to the status of the software application that is a candidate for transformation (query block 304). There are three possible statuses: retire (block 306), legacy (transform an existing application into a new version—block 310), or target (institute a totally new application—block 330).

A candidate that is a legacy application needs to be kept running. However, an enterprise likely is not looking for major enhancements or investments in these applications. These applications are therefore good candidates for binary transformation. Applications that are in the target (new) enterprise architecture are strategic for the enterprise and will be targeted for new investment and enhancement work. These applications therefore need to be kept current and refreshed. Lastly, the applications that have their retirement already planned need not be brought into the target transformation and require no further consideration. Thus, no further action is taken for applications that are slated for retirement (terminator block 308).

For legacy applications that are being transformed into a transformed system, candidate legacy applications undergo a binary candidate survey (block 312), which scores the application characteristics on a number of business, technical and application factors and enumerates an aggregate score. Candidate legacy applications passing the threshold for binary transformation based on score then undergo preliminary evaluation and testing (block 314). If the target hardware can run the current OS (block 316) for a candidate legacy application, then the candidate legacy application becomes a candidate for binary transformation without OS upgrade (block 318). If the target hardware needs a newer version of the OS (block 320), the candidate legacy application then becomes a candidate for binary transformation with OS upgrade (block 322). Both binary candidates (summing block 324) are then sent for testing (block 326) in a target environment. If no problems are found, the process ends at terminator block 328. However, if problems are found during testing, then the candidate application will revert (via summation block 344 and decision block 346) to like-for-like (block 348) or custom transformation (block 350).

If the target applications (block 330) are already on a target platform that supports a standard binary load (block 332), that binary load is performed to transform the target application. If the hardware and data center properly support that binary move (block 334), then the process ends (terminator block 336). Otherwise, the binary image is moved to another hardware platform (block 338) and retested (block 340). If the retest is successful, the process ends (terminator block 342). Otherwise, the target application is routed to block 348 or block 350 for like-for-like or custom transformation.

Another tool for evaluating the cost of an application transformation is an application survey. Application surveys inquire as to various attributes of an application and are used to produce a scorecard that is indicative of the transformation path to follow and associated risks. Exemplary application surveys are shown below in Table II.

TABLE II

| Metric | Attribute Definition | Attribute Weight | Attribute Score |
| --- | --- | --- | --- |
| Application Activity | Functional Releases in past 24 months or planned in the future<br>High: Active application with regular quarterly medium to large sized (>20FTE) enhancement releases<br>Medium: Application with irregular or smaller quarterly releases (<20FTE)<br>Low: Application in maintenance mode with few to no functional releases | 1 | High: 11 pts<br>Medium: 6 pts<br>Low: 2 pts |
| Mission Criticality | Business dependency - severity and extent of business impact due to application unavailability<br>High: Impacts multiple business functions with and widespread business impacts<br>Medium: Limited impact - business transactions can be rerun and recovered when application is restored<br>Low: Limited business impact - workaround and manual processes provide business continuity | 1 | High: 11 pts<br>Medium: 6 pts<br>Low: 2 pts |
| Retirement Status | Status of application retirement plans and funding commitment<br>High: Target retirement date not established or is over 3 years away<br>Medium: Target retirement date established with funding being worked<br>Low: Target retirement date established with funding commitment in place | 1 | High: 11 pts<br>Medium: 6 pts<br>Low: 2 pts |
| Application codependency | Real-time interfaces that this application has with other applications<br>High: >15 interfaces<br>Medium: 5-15 interfaces<br>Low: <5 interfaces | 1 | High: 11 pts<br>Medium: 6 pts<br>Low: 2 pts |
| Non Functional Requirement Gap | Application ability to meet present and projected non functional requirements<br>High: Application is not meeting non functional requirements i.e. performance, volume, availability or maintainability. Application architecture changes/enhancements are needed to address current gaps.<br>Medium: Application is meeting current requirements but will require architectural changes to meet projected requirements in 12-18 months.<br>Low: Application is meeting current non functional requirements and no changes to the non functional requirements are foreseen. | 1 | High: 11 pts<br>Medium: 6 pts<br>Low: 2 pts |
| OS Gap | OS Gap/Currency<br>High: Application's current OS version is over 5 versions back from target OS<br>Medium: Application's current OS version is 3-4 versions back from target OS<br>Low: Application's current OS version is only is 1-2 versions back from target OS | 1 | High: 11 pts<br>Medium: 6 pts<br>Low: 2 pts |
| COTS Gap | COTS Gap/Currency<br>High: Application uses several non-conformant components or off-version components<br>Medium: Application uses a few non-conformant or off-version components<br>Low: Application uses current versions of TSS standard components | 1 | High: 11 pts<br>Medium: 6 pts<br>Low: 2 pts |
| OS Vendor Support | Vendor Support/Guarantee of Binary Compatibility Mode operation<br>High: Limited support/guarantee for source->target OS, restrictions and exclusions, requires newer | 1 | High: 11 pts<br>Medium: 6 pts<br>Low: 2 pts |

TABLE II-continued

| Metric | Attribute Definition | Attribute Weight | Attribute Score |
|--------|---------------------|------------------|-----------------|
| | versions of COTS compiled on target OS<br>Medium: Vendor supports binary compatibility mode operation - limited restrictions and exclusions<br>Low: Vendor guarantees binary compatibility mode operation - few or no restrictions or exclusions | | |
| COTS Support | COTS vendor support of target OS<br>High: Critical COTS components are not supported on the target platform<br>Medium: Majority of critical COTS components are supported on the target platform<br>Low: All COTS components are supported on the target platform in binary compatibility mode | 1 | High: 11 pts<br>Medium: 6 pts<br>Low: 2 pts |

A weighted scorecard based on business, application and technical infrastructure attributes will be used to determine if the application is a suitable candidate for binary transformation. The calculated score is compared with thresholds that are set based on client's risk tolerance. Exemplary summed scores are below 30, suggesting a binary transformation; 30 to 60, suggesting binary is possible, but like-for-like or custom transformation may be needed; and over 60, suggesting like-for-like or custom transformation is mandatory. Note that these scores (30, 60) are normalized to a scale of 100, and thus are defined according to that scale.

Figure 4:
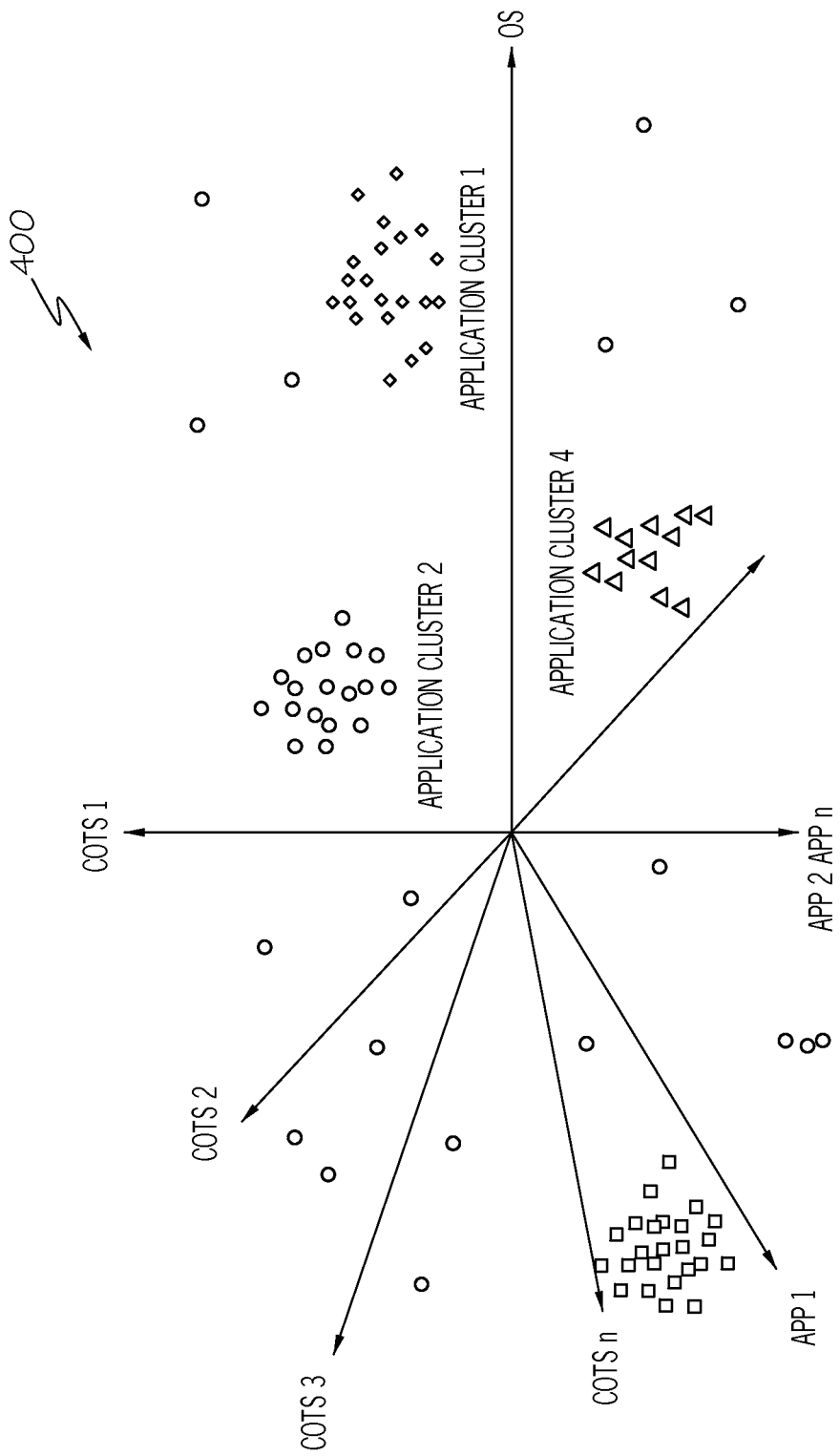
FIG. 4 illustrates a cluster of applications being transformed.

With reference now to FIG. 4, an exemplary application cluster map 400 is presented. Application cluster map 400 depicts the organization of work into efficient application clusters. These application clusters are formed based on similarities in the transformation needed or in the grouping dependencies with other applications. Organizing work into efficient application clusters ensures that economies of scale, organization and integration are exploited to the fullest extent. The most efficient clusters are formed by a set of applications that share similarities in design and construction (languages, COTS components, and libraries) and are highly cohesive internally and loosely coupled externally with respect to interfaces. Application clusters can be identified by analyzing commonality and variability between applications that are in the transformation set. Each of the application characteristics such as OS, COTS components used, or dependent applications can be assigned a dimension. Clustering analysis then seeks to find the applications that are close in proximity in this multi-dimensional space. Scheduling of the application clusters also needs careful consideration, in order to ensure availability of critical OS and COTS expertise in the applicable COE as well as a client's release planning cycles, so that the transformation work can be scheduled around major functionality releases.

Thus, a legacy application from a cluster of similar types of applications (e.g., Application Cluster 2) indicates that a software factory, which utilizes recurrent routines by a same group of experts, will likely be an efficient tool for transforming the legacy applications into new applications.

On large-scale transformation projects there is a significant opportunity to organize and time the transformation to exploit economies of scale that are inherent in the transformation process, knowledge and expertise of resources, use of transformation tools and other reusable assets, organization and the dependencies within applications being transformed. One such economy of scale is through the use of a software factory. In one embodiment, the application transformation will ultimately be performed in a software factory. In order to accurize the transformation process, however, use of the software factory is initially emulated.

Figure 5:
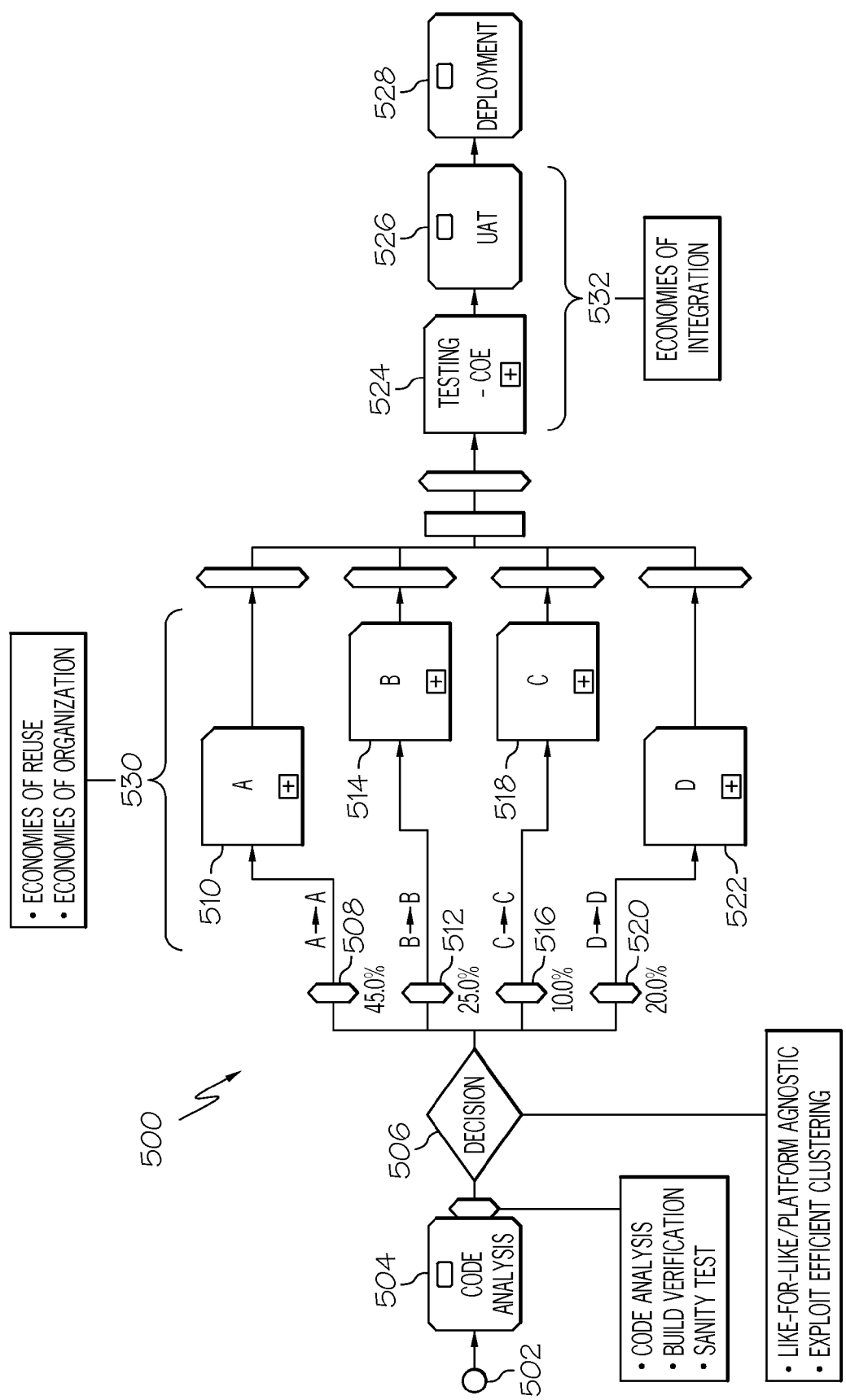
FIG. 5 depicts an exemplary software factory that can be used to transform a legacy IT system.

Referring now to FIG. 5, an exemplary transformation factory 500 for automated analysis and for grouping applications into efficient clusters leveraging economies of scale, organization and integration is presented. After initiator block 502, an analysis of the existing code is performed (block 504). Once the transformed code has been determined to have no missing pieces, a confirmation is reached (block 506) that all the source code is available and can be built in the source environment. For example, assume that all code can be transformed in a like-for-like manner (see block 348 above in FIG. 3). Thus, in the example shown in FIG. 5, 45% (508) of legacy code uses platform "A" (hardware, operating system, language in which the code is written, etc.), 25% (512) uses platform "B", 10% (516) uses platform "C", and 20% (520) uses platform "D". The identified software is then sent to the appropriate transformation logic (510, 514, 518, or 522), which transforms the legacy code into the new code. The transformed code is tested using testing logic 524 in a COE, is further tested by a user at a user acceptance testing (UAT) station 526, and is finally deployed at block 528. Note that this allows a cluster 530 of activity to reuse transformation logic (e.g., 510, 514, 518, and 522). Similarly, cluster 532 leverages the testing logic found in blocks 524 and 526.

While FIG. 5 assumes that a like-for-like transformation will occur, a similar software factory can be used when custom migration/transformation is required (see block 350 in FIG. 3). In that scenario, the initial platform is still identified in block 506. However, the transformation logic in blocks 510, 514, 518, and 522 incorporate logic needed to custom-transform the legacy code into a new platform.

Figure 6:
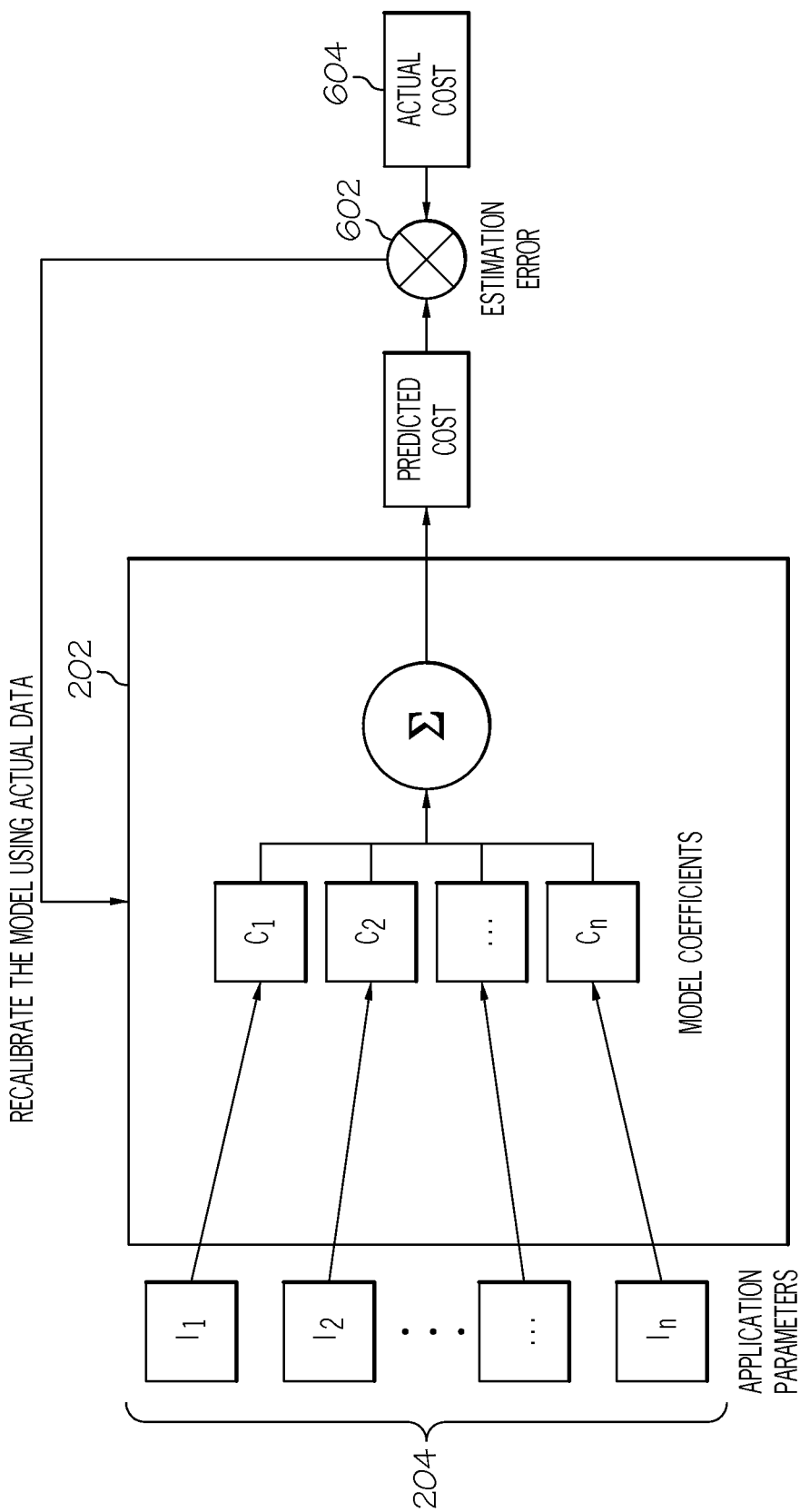
FIG. 6 illustrates a system for accurizing a transformation cost prediction model using real and emulated transformation data.

With reference now to FIG. 6, a predictive estimation cost model 202, as shown in FIG. 2, is modified with estimation error feedback logic 602 to arrive at an actual cost 604 of the transformation project through the use of actual data obtained during the simulated and/or actual use of the decision tree 300 and/or transformation factory 500 shown above. The feedback loop generated by estimation error feedback logic 602 provides a way to keep the model up-to-date and continuously improve estimation accuracy as more data becomes available, resulting in a "living model" that is updated based on new data and actual results.

With reference now to FIG. 7, a high-level flow chart of exemplary steps taken to plan and optimize information technology (IT) infrastructure transformations is presented. After initiator block 702, a predictive effort estimation model for transforming an existing IT infrastructure into a transformed IT infrastructure is created (block 704). In one embodiment, transforming the existing IT infrastructure comprises replacing legacy applications and planning for future applications within the existing IT infrastructure. The predictive effort estimation model is initially created using history-based predictors for transforming the existing IT infrastructure based on: application sizes in the existing IT infrastructure, a quantity of system interfaces in the existing IT infrastructure, a quantity of future commercial off-the-shelf (COTS) components to be used in the existing IT infrastructure, an operating system (OS) gap that describes differences between existing operating systems and proposed new operating systems in the existing IT infrastructure, a clustering of applications, and a quantity of nodes in the existing IT infrastructure. As described in block 706, the introduction of a new application into the existing IT infrastructure through a use of a decision tree as a transformation path determination is emulated to create a transformation path emulation. As described in block 708, the use of a software factory is emulated for introducing the new application into the existing IT infrastructure to create a software factory use emulation for creating the transformed IT infrastructure. The predictive effort estimation model is accurized using results from the transformation path emulation and the software factory use emulation to create an accurized transformed IT infrastructure model (block 710). A physical transformed IT infrastructure is then deployed using the accurized transformed IT infrastructure model to physically transform the existing IT infrastructure (block 712). The process ends at terminator block 714.

As described herein, a model driven transformation approach based on quantitative scorecards and decision models provides effective means to plan and optimize large-scale, diverse legacy transformations. Predictive cost models are used to estimate transformation costs and prepare client proposals. The factory based approach provides an efficient implementation method for realizing large scale legacy transformation. The model driven factory based approach and the illustrative application to planning and implementing a large scale legacy transformation presented enable a user to: build and use decision models and planning tools to achieve optimal infrastructure transformation, help users in planning and optimizing large-scale IT infrastructure transformations, build and use predictive cost and pricing models for infrastructure transformation projects to prepare transformation proposals, and customize the models and continuously refine their prediction accuracy by feeding back the actual performance data into the prediction model.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method of planning and optimizing information technology (IT) infrastructure transformations, the computer implemented method comprising:
   creating a predictive effort estimation model for transforming an existing IT infrastructure into a transformed IT infrastructure, wherein transforming the existing IT infrastructure comprises replacing legacy applications;
   emulating an introduction of a new application into the existing IT infrastructure through a use of a decision tree for transformation path determination to create a transformation path emulation;
   emulating a use of a software factory for introducing the new application into the existing IT infrastructure to create a software factory use emulation for creating the transformed IT infrastructure;
   accurizing the predictive effort estimation model with results from the transformation path emulation and the software factory use emulation to create an accurized transformed IT infrastructure model;
   determining, by one or more processors, a Prediction of Effort (POE) for optimizing the existing IT infrastructure based on a formula:

$(POE) = \Sigma(Cl \times KLOC) + (Cs \times System\ Interfaces) + (Cc \times COTS) + (Co \times OS\ Gap\ Factor) + (Cn \times Nodes) + K$,
   where:

$Cl$ = a first weighting value for a first parameter, wherein the first parameter is Kilo-Lines Of Code (KLOC), wherein KLOC describes a quantity of lines of code used in applications in the existing IT infrastructure;
   $Cs$ = a second weighting value for a second parameter, wherein the second parameter is System Interfaces, wherein the System Interfaces describe a quantity of system interfaces that are required between legacy software in the existing IT infrastructure and other software modules in the existing IT infrastructure;
   $Cc$ = a third weighting value for a third parameter, wherein the third parameter is Commercial Off The Shelf (COTS), wherein COTS describes a quantity of COTS packages to be used to create the physical transformed IT infrastructure;
   $Co$ = a fourth weighting value for a fourth parameter, wherein the fourth parameter is an Operating System (OS) Gap Factor, wherein the OS Gap Factor describes a level of difference between a legacy OS used in the existing IT infrastructure and a new OS used in the physical transformed IT infrastructure;
   $Cn$ = fifth weighting value for a fifth parameter, wherein the fifth parameter is Nodes, wherein Nodes describes a quantity of object class nodes used in legacy software used in the existing IT infrastructure and the new application used in the physical transformed IT infrastructure; and
   $K$ = a normalizer value that represents an initially predicted fixed cost component of any software transformation process that is similar to transforming the existing IT infrastructure into the physical transformed IT infrastructure; and
   wherein each of the first, second, third, fourth, and fifth weighting values represents a relative importance of the respective first, second, third, fourth, and fifth parameters when transforming the existing IT infrastructure into the physical transformed IT infrastructure; and
   deploying a physical transformed IT infrastructure using the accurized transformed IT infrastructure model to physically transform the existing IT infrastructure.

2. The computer-implemented method of claim 1, wherein the predictive effort estimation model is initially created using history-based predictors for transforming the existing IT infrastructure based on application sizes in the existing IT infrastructure.

3. The computer-implemented method of claim 2, wherein the history-based predictors are further based on a quantity of system interfaces between software modules in the existing IT infrastructure.

4. The computer-implemented method of claim 3, wherein the history-based predictors are further based on a quantity of future commercial off-the-shelf (COTS) applications to be used in the existing IT infrastructure.

5. The computer-implemented method of claim 4, wherein the history-based predictors are further based on an operating system (OS) gap that describes differences between existing operating systems and proposed new operating systems in the existing IT infrastructure.

6. The computer-implemented method of claim 5, wherein the history-based predictors are further based on an application being part of a cluster of similar applications in the existing IT infrastructure.

7. The computer-implemented method of claim 1, wherein transforming the existing IT infrastructure further comprises planning for future applications within the existing IT infrastructure.

8. A computer program product for planning and optimizing information technology (IT) infrastructure transformations, the computer program product comprising:
a non-transitory computer readable storage media;
first program instructions to create a predictive effort estimation model for transforming an existing IT infrastructure into a transformed IT infrastructure, wherein transforming the existing IT infrastructure comprises replacing legacy applications;
second program instructions to emulate an introduction of a new application into the existing IT infrastructure through a use of a decision tree for transformation path determination to create a transformation path emulation;
third program instructions to emulate a use of a software factory for introducing the new application into the existing IT infrastructure to create a software factory use emulation for creating the transformed IT infrastructure;
fourth program instructions to accurize the predictive effort estimation model with results from the transformation path emulation and the software factory use emulation to create an accurized transformed IT infrastructure model;
fifth program instructions to determine a Prediction of Effort (POE) for optimizing the existing IT infrastructure based on a formula:

$$(POE) = \Sigma (Cl \times KLOC) + (Cs \times \text{System Interfaces}) + (Cc \times COTS) + (Co \times \text{OS Gap Factor}) + (Cn \times \text{Nodes}) + K,$$

where:
$Cl$ = a first weighting value for a first parameter, wherein the first parameter is Kilo-Lines Of Code (KLOC), wherein KLOC describes a quantity of lines of code used in applications in the existing IT infrastructure;
$Cs$ = a second weighting value for a second parameter, wherein the second parameter is System Interfaces, wherein the System Interfaces describe a quantity of system interfaces that are required between legacy software in the existing IT infrastructure and other software modules in the existing IT infrastructure;
$Cc$ = a third weighting value for a third parameter, wherein the third parameter is Commercial Off The Shelf (COTS), wherein COTS describes a quantity of COTS packages to be used to create the physical transformed IT infrastructure;
$Co$ = a fourth weighting value for a fourth parameter, wherein the fourth parameter is an Operating System (OS) Gap Factor, wherein the OS Gap Factor describes a level of difference between a legacy OS used in the existing IT infrastructure and a new OS used in the physical transformed IT infrastructure;
$Cn$ = fifth weighting value for a fifth parameter, wherein the fifth parameter is Nodes, wherein Nodes describes a quantity of object class nodes used in legacy software used in the existing IT infrastructure and the new application used in the physical transformed IT infrastructure; and
$K$ = a normalizer value that represents an initially predicted fixed cost component of any software transformation process that is similar to transforming the existing IT infrastructure into the physical transformed IT infrastructure; and
wherein each of the first, second, third, fourth, and fifth weighting values represents a relative importance of the respective first, second, third, fourth, and fifth parameters when transforming the existing IT infrastructure into the physical transformed IT infrastructure; and
sixth program instructions to deploy a physical transformed IT infrastructure using the accurized transformed IT infrastructure model to physically transform the existing IT infrastructure, and
wherein the first, second, third, fourth, fifth, and sixth program instructions are stored on the non-transitory computer readable storage media, and wherein the first, second, third, fourth, fifth, and sixth program instructions are executable by a processor.

9. A computer-implemented method of planning and optimizing information technology (IT) infrastructure transformations, the computer implemented method comprising:
creating a predictive effort estimation model for transforming an existing IT infrastructure into a transformed IT infrastructure, wherein transforming the existing IT infrastructure comprises replacing legacy applications;
emulating an introduction of a new application into the existing IT infrastructure through a use of a decision tree for transformation path determination to create a transformation path emulation;
emulating a use of a software factory for introducing the new application into the existing IT infrastructure to create a software factory use emulation for creating the transformed IT infrastructure;
accurizing the predictive effort estimation model with results from the transformation path emulation and the software factory use emulation to create an accurized transformed IT infrastructure model;
determining, by one or more processors, whether to transform the existing IT infrastructure into a physical transformed IT infrastructure using a binary transformation, a like-for-like transformation, or a custom transformation, wherein the binary transformation moves binary executable code from the existing IT infrastructure into the physical transformed IT infrastructure, the like-for-like transformation recompiles the new software to create a recompiled new software that is supported by an existing OS in the existing IT infrastructure, and wherein the custom transformation migrates applications from legacy hardware in the existing IT infrastructure to hardware targets in the physical transformed IT infrastructure, wherein determining whether to transform the existing IT infrastructure into the physical transformed IT infrastructure using a binary transformation, a like-for-like transformation, or a custom transformation is performed by:

receiving, by one or more processors, results from a scorecard, wherein the scorecard identifies transformation attributes for transforming the existing IT infrastructure into the physical transformed IT infrastructure, wherein the transformation attributes comprise:
- an application activity attribute, wherein the application activity attribute describes a frequency of recent and planned changes to applications run on the existing IT infrastructure;
- a mission criticality attribute, wherein the mission criticality attribute describes an extent of business impact that would be caused by unavailability of the existing IT infrastructure;
- a retirement status attribute, wherein the retirement status attribute describes a status of plans to retire the existing IT infrastructure;
- an application codependency attribute, wherein the application codependency attribute describes how many other applications interface with the new application in the physical transformed IT infrastructure;
- an Operating System (OS) gap attribute, wherein the OS gap attribute describes a functionality gap between a first OS in the existing IT infrastructure and a second OS required to operate the new application in the physical transformed IT infrastructure; and
- a Commercial Off The Shelf (COTS) gap attribute, wherein the COTS gap attribute describes how many COTS components can be used by the new application in the physical transformed IT infrastructure;

assigning a weight to the results from the scorecard for each of the transformation attributes;

summing weights for the results from the scorecard for each of the transformation attributes to generate a calculated weighted attributes score; and associating a first range of calculated weighted attributes scores with the binary transformation, a second range of calculated weighted attributes scores with the like-for-like transformation, and a third range of calculated weighted attributes scores with the custom transformation; and deploying the physical transformed IT infrastructure using the accurized transformed IT infrastructure model to physically transform the existing IT infrastructure.

10. The computer-implemented method of claim 9, further comprising:
in response to the calculated weighted attributes score falling within the first range, transforming the existing IT infrastructure into the physical transformed IT infrastructure using the binary transformation.

11. The computer-implemented method of claim 9, further comprising:
in response to the calculated weighted attributes score falling within the second range, transforming the existing IT infrastructure into the physical transformed IT infrastructure using the like-for-like transformation.

12. The computer-implemented method of claim 9, further comprising:
in response to the calculated weighted attributes score falling within the third range, transforming the existing IT infrastructure into the physical transformed IT infrastructure using the custom transformation.

\* \* \* \* \*